Dec. 1, 1925.
S. G. MEWBORN
1,563,911
AUTOMOBILE DIRIGIBLE HEADLIGHT
Filed April 9, 1925
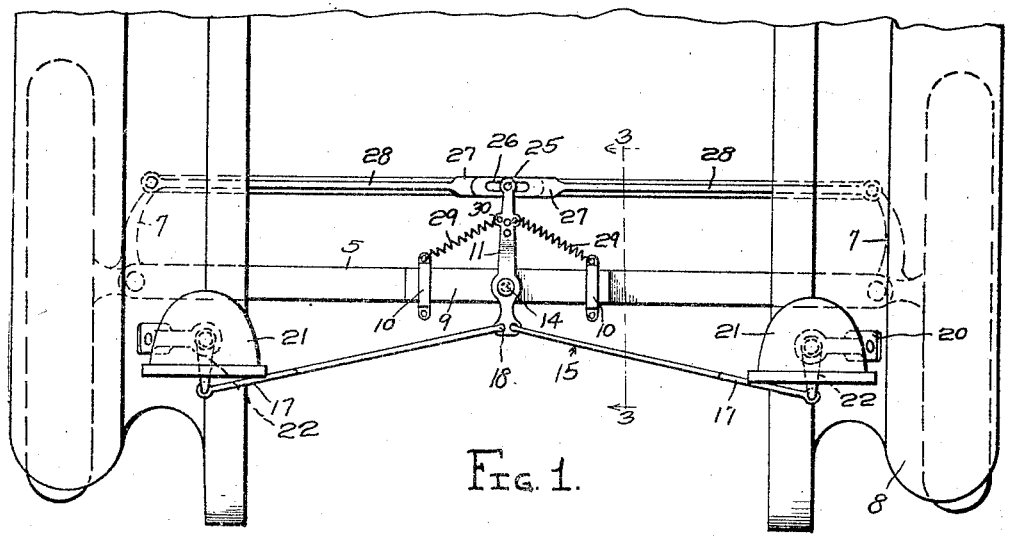
Fig. 1.
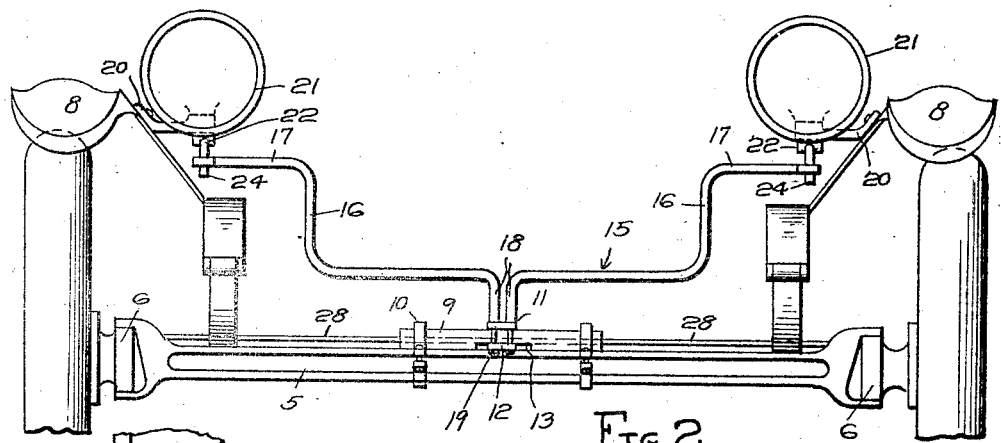
Fig. 2.
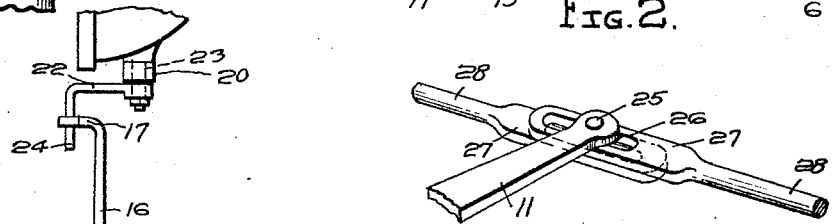
Fig. 3.        Fig. 4.
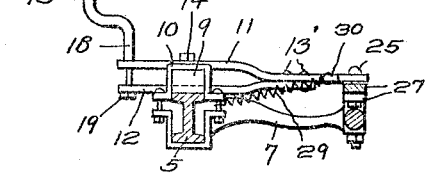
Inventor
S. G. MEWBORN,
By B. P. Fishburn
Attorney Patented Dec. 1, 1925.

1,563,911

UNITED STATES PATENT OFFICE.

SIDNEY G. MEWBORN, OF WILSON, NORTH CAROLINA.

AUTOMOBILE DIRIGIBLE HEADLIGHT.

Application filed April 9, 1925. Serial No. 21,931.

*To all whom it may concern:*

Be it known that I, SIDNEY G. MEWBORN, a citizen of the United States, residing at Wilson, in the county of Wilson and State of North Carolina, have invented certain new and useful Improvements in Automobile Dirigible Headlights, of which the following is a specification.

My invention relates to improvements in dirigible headlights for automobiles.

An important object of the invention is to provide means of the above mentioned character, which is simple in construction, cheap to manufacture, and will permit of the slight steering movements of the front wheels of the automobile, without effecting a steering movement of the headlights.

Other objects and advantages of the invention will be apparent during the course of the following description.

In the accompanying drawings, forming a part of this specification and in which like numerals are employed to designate like parts throughout the same, Figure 1 is a plan view of the apparatus embodying my invention, Figure 2 is a side elevation of the same, Figure 3 is a transverse section taken on line 3—3 of Figure 1, parts omitted, and, Figure 4 is a perspective view of the inner end of the shifting lever and associated rods.

In the drawings, wherein for the purpose of illustration is shown a preferred embodiment of my invention, the numeral 5 designates the front axle of an automobile, in the ends of which are pivoted the usual steering knuckles 6, carrying rearwardly extending arms 7, which are operated in the usual manner. The numeral 8 designates the fenders.

Arranged centrally upon the axle 5 is a support or block 9, rigidly held thereon by clamps 10. The numeral 11 designates an operating lever, arranged above the support 9, with a companion lever 12 operating within a recess 13, formed in the support 9. The levers 11 and 12 are riveted or otherwise rigidly attached at 13', and form in effect one lever. The operating lever is pivoted to the support 9 by a pin 14, as shown.

The numeral 15 designates shifting rods or links, which are bent to provide upstanding intermediate portions 16, provided with horizontal extensions 17. At their inner ends, the connecting rods 15 have depending portions 18, provided with reduced extremities, passing through apertures in the forward end of the levers 11 and 12. These reduced extension have nuts 19. The connecting rods are therefore pivotally connected with the forward end of the operating lever, which lever has such forward end forked.

Attached to the fenders 8 are brackets 20, pivotally supporting headlights 21. These headlights are adapted to be turned by arms or cranks 22, which are rigidly attached to the spindles 23 of the headlights, as more clearly shown in Figure 3. The cranks 22 carry depending vertical fingers 24, which are slidably mounted in apertures formed in the free ends of the horizontal extensions 17. The connecting rods 15 are wholly supported by the operating lever, and since the fingers 24 may slide vertically within the apertures of the extensions 17, it is obvious that the headlights are free to partake of relative vertical movement with respect to the shifting rods 15. The rear end of the operating lever carries a depending pin or pivot element 25, which operates within elongated slots 26, formed in heads 27, carried by operating rods 28. The operating rods 28 extend outwardly and are pivotally connected with the ends of the knuckle arms 7. When the front wheels are in the central or straight position, the pivot element 25 will be equi-distantly spaced from the ends of both slots 26. It is apparent that when the front wheels partake of slight steering movements, that the operating rods 28 will move longitudinally slightly, without their end walls engaging with the pivot element, for shifting the operating lever upon its pivot. However, when the front wheels are steered to any considerable extent the end wall of the corresponding operating rod will engage the pivot element and swing the operating lever upon its pivot. The operating lever is normally retained in the straight or neutral position by means of retractile coil springs 29, secured to the rear end portion thereof, as shown at 30. The forward ends of these springs are attached to the clamps 10, by any suitable means, as shown.

In operation, when the automobile is traveling, the headlamps will not be turned by the slight steering movements of the front wheels, which frequently occurs when the wheels meet with an obstruction in the roadway. When the machine is steered in either direction, it is obvious that the operating rod will shift the rear end of the operating lever in the proper direction, for turning the headlamps in the direction, in which the machine will travel.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A dirigible headlight mechanism comprising an operating lever to be pivotally mounted upon the front axle of an automobile, yielding means adapted to return the operating lever to the normal position and normally retain the same in such a position, headlamps carried by the automobile, operative connecting means between the lever and headlamps so that both headlamps are simultaneously turned by the movement of the lever, operating rods adapted for connection with the steering knuckle arms and provided at their inner ends with elongated slots, and a pin carried by the operating lever and arranged within the said slots, said pin being spaced from the ends of the slots when the lever is in the neutral position and the operating rods are in the position which they occupy when the machine is traveling in a substantially straight course whereby the slight steering movements of the front wheels will not effect a shifting movement of the headlights.

2. A dirigible headlight mechanism, comprising a single lever pivotally mounted upon the front axle of an automobile, a pair of springs connected with the lever upon one side of its pivot and connected with the axle, said springs serving to oppose the swinging movement of the lever in opposite directions and to retain the same in a central starting position, a pair of headlights pivoted upon the automobile, cranks connected with the headlights to turn them, links pivotally connected with the cranks and extending inwardly and pivotally connected with the single lever so that both headlights are simultaneously moved by the single lever, operating rods having their outer ends pivotally connected with the steering knuckles of the front wheels, and having their inner ends overlapping and provided with elongated slots, and a pin secured to the single lever and extending through the elongated slots, said pin being spaced from the ends of the slots when the lever is in the central starting position and the operating rods are in the position which they occupy when the machine is traveling in a substantially straight course, whereby slight steering movements of the front wheels do not shift the headlights.

In testimony whereof I affix my signature.

SIDNEY G. MEWBORN.